United States Patent
You et al.

(10) Patent No.: US 12,224,844 B2
(45) Date of Patent: Feb. 11, 2025

(54) WIRELESS COMMUNICATION METHOD AND TERMINAL DEVICE FOR DETERMINING WHETHER BEAM FAILURE RECOVERY IS SUCCESSFUL

(71) Applicant: GUANGDONG OPPO MOBILE TELECOMMUNICATIONS CORP., LTD., Guangdong (CN)

(72) Inventors: Xin You, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 345 days.

(21) Appl. No.: 17/584,554

(22) Filed: Jan. 26, 2022

(65) Prior Publication Data

US 2022/0149926 A1    May 12, 2022

Related U.S. Application Data

(63) Continuation of application No. PCT/CN2019/099140, filed on Aug. 2, 2019.

(51) Int. Cl.
H04B 7/08    (2006.01)
H04B 7/06    (2006.01)
(Continued)

(52) U.S. Cl.
CPC ............ *H04B 7/088* (2013.01); *H04W 76/19* (2018.02); *H04W 80/02* (2013.01)

(58) Field of Classification Search
CPC ..... H04B 7/088; H04B 7/0617; H04W 76/19; H04W 80/02; H04L 5/001; H04L 5/0053; H04L 5/0098; H04L 1/1848
See application file for complete search history.

(56) References Cited

U.S. PATENT DOCUMENTS

2020/0322031 A1    10/2020 You et al.
2021/0029724 A1*    1/2021 Tsai .................. H04W 28/0278
(Continued)

FOREIGN PATENT DOCUMENTS

CN    109391344 A    2/2019
CN    109962756 A    7/2019
(Continued)

OTHER PUBLICATIONS

First Office Action issued for Chinese Application No. 201980091196.0 issued Oct. 19, 2022. 19 pages with English translation.
(Continued)

*Primary Examiner* — Harry H Kim
(74) *Attorney, Agent, or Firm* — PERKINS COIE LLP

(57) ABSTRACT

Provided are a wireless communication method and a terminal device, wherein same can determine whether a beam failure recovery is successful. The method comprises: after a beam failure recovery request of a secondary cell is sent to a network device, a terminal device detecting first downlink information on the secondary cell; and the terminal device determining, according to whether the first downlink information is successfully detected, whether the beam failure recovery of the secondary cell is successful.

18 Claims, 3 Drawing Sheets

(51) Int. Cl.
*H04L 1/1829* (2023.01)
*H04L 5/00* (2006.01)
*H04W 76/19* (2018.01)
*H04W 80/02* (2009.01)

(56) References Cited

U.S. PATENT DOCUMENTS

| | | | | |
|---|---|---|---|---|
| 2021/0314049 | A1* | 10/2021 | Matsumura | H04W 24/10 |
| 2022/0123823 | A1* | 4/2022 | Dong | H04W 72/1263 |
| 2022/0158766 | A1* | 5/2022 | Zhang | H04L 1/0027 |
| 2022/0271817 | A1* | 8/2022 | Lee | H04B 7/0617 |
| 2023/0379092 | A1* | 11/2023 | Chin | H04W 72/232 |

FOREIGN PATENT DOCUMENTS

| | | |
|---|---|---|
| CN | 110022613 A | 7/2019 |
| CN | 110034799 A | 7/2019 |
| WO | 2018202010 A1 | 11/2018 |
| WO | 2019032882 A1 | 2/2019 |
| WO | 2019120260 A1 | 6/2019 |
| WO | 2019141398 A1 | 7/2019 |

OTHER PUBLICATIONS

Decision of Rejection of the Chinese application No. 201980091196.0, issued on Aug. 30, 2023, 18 pages with English translation.
ASUSTek, "On the validity of BFD counting for BFR procedure", R2-1806904, 3GPP TSG-RAN WG2 Meeting #102 Busan, Korea, May 21-25, 2018, 9 pages.
Nokia (Rapporteur), Nokia Shanghai Bell, "Report of e-mail discussion 102#70—Reset of BFD (Nokia)", R2-1810159, 3GPP TSG-RAN WG2 Meeting NR Adhoc 1807 Montreal, Canada, Jul. 2-6, 2018, 8 pages.
Nokia, Nokia Shanghai Bell, "Clarification on beam failure detection and recovery procedure", R2-1808026, 3GPP TSG-RAN WG2 Meeting #102 Busan, South Korea, May 21-25, 2018, 3 pages.
Sharp, "Remaining issues on beam failure recovery", R2-1805864, 3GPP TSG RAN WG2 Meeting #101bis Sanya, China, Apr. 16-20, 2018, 4 pages.
European Search Report Mailed Jun. 10, 2022 In EP Application No. 19940447.6.
Second Office Action of the Chinese application No. 201980091196.0, issued on Apr. 15, 2023, 20 pages with English translation.
Sharp, "Discussion on mechanisms for beam failure recovery", R1-1720613, 3GPP TSG-RAN WG1 Meeting #91 Reno, Nevada, USA, Nov. 27-Dec. 1, 2017, 6 pages.
Huawei, HiSilicon, Beam failure recovery for SCell with new beam information, 3GPP TSG RAN WG1 Meeting #97 R1-1907533, Reno, USA, May 13-17, 2019, 7 pages.
International Search Report Mailed Apr. 21, 2020 In Application No. PCT/CN2019/099140, 29 pages.
Written Opinion Mailed Apr. 21, 2020 in Application No. PCT/CN2019/099140, 9 pages.
European Patent 1st Office Action dated Jun. 26, 2024 of European Application No. 19940447.6.

* cited by examiner

WIRELESS COMMUNICATION METHOD AND TERMINAL DEVICE FOR DETERMINING WHETHER BEAM FAILURE RECOVERY IS SUCCESSFUL

CROSS-REFERENCE TO RELATED APPLICATION

This application is a continuation of PCT Application No. PCT/CN2019/099140, filed Aug. 2, 2019, the entire contents of which are incorporated herein by reference.

TECHNICAL FIELD

The embodiments of the present application relate to the field of communication technologies, and in particular, to a wireless communication method and a terminal device.

BACKGROUND

In the new radio system, a network device may communicate with a terminal device through a secondary cell. And the network device may use beamforming technology to communicate with the terminal device to improve the communication performance.

However, in the process of using the secondary cell for communication, beam failure may occur. In this case, the terminal device will perform a beam failure recovery operation. How the terminal device determines whether the beam failure recovery is successful is a problem to be solved urgently.

SUMMARY

The embodiments of the present application provide a wireless communication method and a terminal device, which can determine whether beam failure recovery is successful.

In a first aspect, there is provided a wireless communication method, including: after sending a beam failure recovery request of a secondary cell to a network device, detecting, by a terminal device, first downlink information on the secondary cell; and according to whether the first downlink information is successfully detected, determining, by the terminal device, whether a beam failure recovery of the secondary cell is successful.

In a second aspect, there is provided a wireless communication method, including: sending, by a terminal device, a beam failure recovery request of a secondary cell to a network device; in a case that a confirmation message of the beam failure recovery request is not received, resending the beam failure recovery request; and when the number of times of sending the beam failure recovery request exceeds a preset value, determining that the beam failure recovery request fails or a beam failure recovery fails.

In a third aspect, there is provided a terminal device, which is configured to execute the method in the first aspect or the second aspect described above.

Specifically, the terminal device includes a functional module for executing the method in the first aspect or the second aspect described above.

In a fourth aspect, there is provided a terminal device, which includes a processor and a memory. The memory is configured to store a computer program, and the processor is configured to call and run the computer program stored in the memory to execute the method in the first aspect or the second aspect described above.

In a fifth aspect, a chip is provided for implementing the method in the first aspect or the second aspect described above.

Specifically, the chip includes: a processor, configured to call and run a computer program from a memory, so that a device installed with the chip executes the method in the first aspect or the second aspect described above.

In a sixth aspect, there is provided a computer-readable storage medium for storing a computer program that enables a computer to execute the method in the first aspect or the second aspect.

In a seventh aspect, there is provided a computer program product including computer program instructions, which cause a computer to execute the method in the first aspect or the second aspect described above.

In an eighth aspect, there is provided a computer program, which when running on a computer, causes the computer to execute the method in the first aspect or the second aspect described above.

Therefore, in the embodiments of the present application, after sending the beam failure recovery request of the secondary cell to the network device, the terminal device detects the first downlink information on the secondary cell. Since whether the first downlink information can be successfully detected on the secondary cell can reflect whether the beam failure recovery of the secondary cell is successful or not, the embodiments of the present application can determine whether the beam failure recovery of the secondary cell is successful according to whether the first downlink information is successfully detected on the secondary cell.

In the embodiments of the present application, the terminal device sends a beam failure recovery request of the secondary cell to the network device; in the case of not receiving the confirmation message of the beam failure recovery request, the terminal device resends the beam failure recovery request; and when the number of times of sending the failure recovery request exceeds the preset value, it is determined that the beam failure recovery request has failed or the beam failure recovery has failed, therefore it can be reasonably confirmed whether the beam failure recovery request or the beam failure recovery has failed.

DETAILED DESCRIPTION

The technical solutions in the embodiments of the present application will be described below in conjunction with the drawings in the embodiments of the present application. Obviously, the described embodiments are a part of the embodiments of the present application, rather than all of the embodiments. Based on the embodiments in the present application, all other embodiments obtained by those of ordinary skill in the art without creative work shall fall within the protection scope of the present application.

The technical solutions of the embodiments of the present application may be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
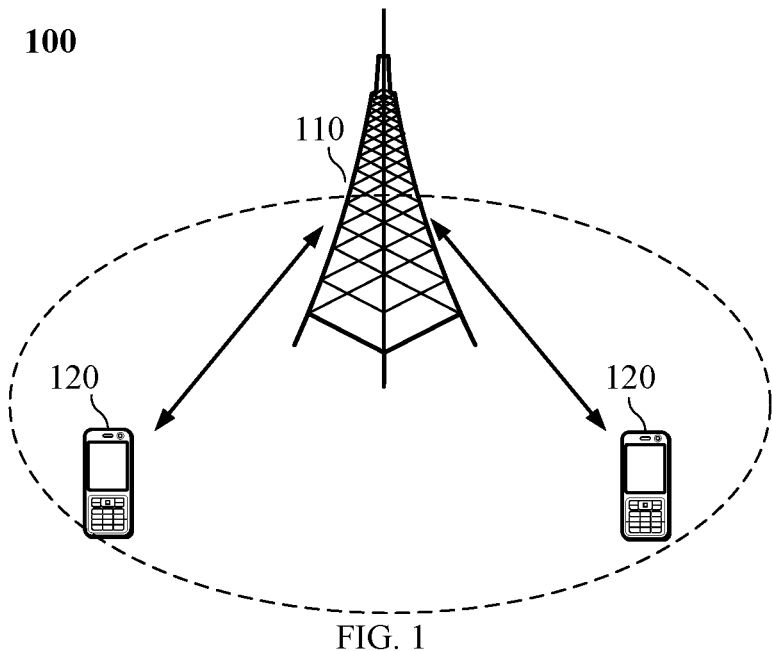
FIG. 1 is a schematic diagram of a communication system architecture provided by an embodiment of the present application.

Exemplarily, the communication system 100 applied in the embodiments of the present application is shown in FIG. 1. The communication system 100 may include a network device 110, and the network device 110 may be a device that communicates with a terminal device 120 (or called a communication terminal or a terminal). The network device 110 may provide a communication coverage for a specific geographic area, and may communicate with the terminal device(s) located in the coverage area. Optionally, the network device 110 may be a Base Transceiver Station (BTS) in a GSM system or a CDMA system, a NodeB (NB) in a WCDMA system, or an Evolutional Node B (eNB or eNodeB) in an LTE system, or a wireless controller in a Cloud Radio Access Network (CRAN), or the network device may be a mobile switching center, a relay station, an access point, a vehicle-mounted device, a wearable device, a hub, a switch, a bridge, a router, a network side device in 5G networks, or a network device in the future evolution of the Public Land Mobile Network (PLMN), etc.

The communication system 100 also includes at least one terminal device 120 located within the coverage area of the network device 110. As used herein, the "terminal device" includes, but is not limited to, connection via wired lines, such as connection via Public Switched Telephone Networks (PSTN), Digital Subscriber Line (DSL), digital cables, and direct cables; and/or another data connection/network; and/or via a wireless interface, such as for cellular networks, Wireless Local Area Networks (WLAN), digital TV networks such as DVB-H networks, satellite networks, AM-FM broadcast transmitter; and/or an apparatus of another terminal device that is set to receive/send communication signals; and/or Internet of Things (IoT) device. The terminal device set to communicate through a wireless interface may be referred to as a "wireless communication terminal", a "wireless terminal" or a "mobile terminal". Examples of the mobile terminals include, but are not limited to, satellite or cellular phones; Personal Communications System (PCS) terminals that can combine cellular radio phones with data processing, fax, and data communication capabilities; may include radio phones, pagers, Internet/intranet access, Web browser, memo pad, calendar, and/or PDA of Global Positioning System (GPS) receiver; and conventional laptop and/or palmtop receivers or other electronic apparatuses including radio telephone transceivers. The terminal device may refer to an access terminal, user equipment (UE), a user unit, a user station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), and a handheld device with wireless communication function, a computing device or other processing devices connected to a wireless modem, an in-vehicle device, a wearable device, a terminal device in 5G networks, or a terminal device in the future evolution of PLMN, etc.

Optionally, Device to Device (D2D) communication may be performed between the terminal devices 120.

Optionally, the 5G system or 5G network may also be referred to as a New Radio (NR) system or a NR network.

FIG. 1 exemplarily shows one network device and two terminal devices. Optionally, the communication system 100 may include a plurality of network devices and the coverage of each network device may include other numbers of terminal devices, which is not limited in the embodiments of the present application.

Optionally, the communication system 100 may also include other network entities such as a network controller and a mobility management entity, which is not limited in the embodiments of the present application.

It should be understood that a device with a communication function in the network/system in the embodiments of the present application may be referred to as a communication device. Taking the communication system 100 shown in FIG. 1 as an example, the communication device may include a network device 110 and a terminal device 120 with a communication function. The network device 110 and the terminal device 120 may be the specific devices described above, which will not be repeated here. The communication device may also include other devices in the communication system 100, such as the network controller, the mobility management entity, and other network entities, which are not limited in the embodiments of the present application.

It should be understood that the terms "system" and "network" in the present disclosure are often used interchangeably in the present disclosure. The term "and/or" in the present disclosure only describes an association relationship between the associated objects, which means that there may be three kinds of relationships. For example, A and/or B may mean the following three situations: A exists alone, A and B exist at the same time, and B exists alone. In addition, the character "/" in the present disclosure generally indicates that the associated objects in the context are in an "or" relationship.

Figure 2:
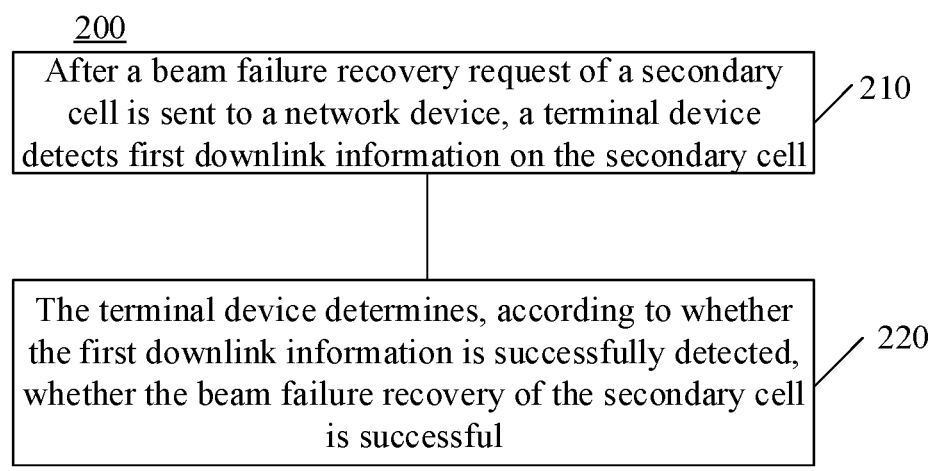
FIG. 2 is a schematic diagram of a wireless communication method provided by an embodiment of the present application.

FIG. 2 is a schematic flowchart of a wireless communication method 200 according to an embodiment of the present application. The method 200 includes at least part of the following contents.

The terminal device sends a Beam Failure Recovery reQuest (BFRQ) of a secondary cell to a network device.

In the embodiment of the present application, in the case of a beam failure in the secondary cell, the terminal device may send a beam failure recovery request of the secondary cell to the network device.

Optionally, in the embodiment of the present application, the terminal device may determine that a beam failure occurs in the secondary cell in the following manners.

The terminal device measures the Channel State Information Reference Signal (CSI-RS) and/or Synchronous Signal/Physical Broadcasting Channel Block (SS/PBCH block) sent on the secondary cell at a physical layer, to determine whether the quality of the corresponding Physical Downlink Control Channel (PDCCH) meets a predetermined/configured threshold (for example, the Hypothetical block error rate (BLER) performance is worse than the threshold). If the signal quality of CSI-RS and/or SSB (SS/PBCH block) is poor enough to meet the corresponding threshold, the physical layer reports one beam failure instance to the Media Access Control (MAC) layer.

At the MAC layer, the physical layer reports one beam failure instance, and the terminal device may add 1 to a counter BFI_COUNTER (Beam Failure Instance (BFI) counter) and restart a beam Failure Detection Timer; and if the counter BFI_COUNTER reaches the maximum value during the running of the timer, it is considered that a beam failure has occurred.

The beam failure recovery request in the embodiments of the present application is optionally sent through a master cell or a master secondary cell of the terminal device.

Specifically, if a beam failure occurs in the secondary cell, it means that the communication quality of the secondary cell is poor, then the terminal device may send the beam failure recovery request through the master cell or the primary secondary cell. The beam failure recovery request may also be sent through other secondary cell, which is not specifically limited in the embodiments of the present application.

Among them, the master cell in the embodiments of the present application may be a master cell in a Master Cell Group (MCG), and the master secondary cell may be a master secondary cell in a Secondary Cell Group (SCG). The master cell or master secondary cell may be referred to as a Special Cell.

In the embodiments of the present application, the beam failure recovery request may carry an identifier of the secondary cell where the beam failure occurs. Therefore, after receiving the beam failure recovery request, the network device may determine the secondary cell where the beam failure occurs according to the identifier of the secondary cell.

In the embodiments of the present application, the beam failure recovery request may carry an index of a downlink beam expected by the terminal device on the secondary cell.

Specifically, the terminal device may measure the CSI-RS and/or SSB sent on the secondary cell, and based on the measurement result of the CSI-RS and/or SSB, select the CSI-RS and/or SSB that satisfies a preset condition (for example, the signal quality exceeds a preset value, etc.), where the index of the downlink beam expected by the terminal device may be a signal index of the CSI-RS and/or SSB, and the signal index indicates the downlink beam expected by the terminal device.

In the embodiments of the present application, the beam failure recovery request may be carried in a scheduling request or an MAC Control Element (CE).

In 210, after sending a beam failure recovery request (Beam failure Recovery reQuest, BFRQ) of the secondary cell to the network device, the terminal device detects the first downlink information on the secondary cell.

In 220, according to whether the first downlink information is successfully detected, the terminal device determines whether the beam failure recovery is successful.

In the embodiments of the present application, because the beam failure occurs in the secondary cell, the terminal device may detect the downlink information on the secondary cell and determine whether the beam failure recovery is successful according to whether the downlink information is successfully detected. If the detection is successful, it is considered that the beam failure recovery is successful. If the beam detection is not successful, it may be considered that the beam failure recovery is unsuccessful.

The first downlink information in the embodiments of the present application may be information carried in a Physical Downlink Control Channel (PDCCH), or it may be information carried in a Physical Downlink Shared Channel (PDSCH), or it may also be a reference signal.

In an implementation manner, after the terminal device sends the beam failure recovery request to the network device through the master cell or the master secondary cell, the terminal device detects second downlink information on the master cell or the master secondary cell; and in the case that the second downlink information is detected (found), based on the second downlink information, the terminal device detects the first downlink information on the secondary cell.

The first downlink information is carried on a physical downlink shared channel, and the second downlink information is carried on a physical downlink control channel that schedules the physical downlink shared channel. Among them, the first downlink information may be all or part of the information carried in the physical downlink shared channel, and the second downlink information may be all or part of the information carried in the physical downlink control channel.

Specifically, the terminal device sends the beam failure recovery request of the secondary cell on the master cell or the master secondary cell, and the network device sends the second downlink information through the physical downlink control channel on the master cell or the master secondary cell based on the beam failure recovery request. The physical downlink control channel may be used to schedule the physical downlink shared channel sent on the secondary cell, that is, the network device may realize the scheduling of the terminal device in a cross-carrier manner, and the terminal device may detect the second downlink information carried in the physical downlink control channel on the master cell or the master secondary cell, and the terminal device detects the first downlink information carried in the physical downlink shared channel on the secondary cell based on the scheduling of the physical downlink control channel. If the first downlink information is detected, it is considered that the beam failure recovery of the secondary cell succeeds.

Optionally, in the implementation of the present application, the physical downlink control channel sent on the master cell or master secondary cell may carry a Transmission Configuration Indicator (TCI), which may be used to indicate to the terminal device the downlink beam used for receiving the downlink information on the secondary cell, for example, the downlink beam used for receiving the information carried on the physical downlink control channel and/or the physical downlink shared channel on the secondary cell. The downlink beam may be the same as the downlink beam expected by the terminal device, or may be different from the downlink beam expected by the terminal device. The downlink beam on which the master cell or master secondary cell receives the information carried in the physical downlink control channel may be the downlink beam on which the current terminal device receives the downlink information on the master cell or master secondary cell.

Alternatively, in the embodiments of the present application, the physical downlink shared channel or physical downlink control channel on the secondary cell may also carry TCI (carried in MAC CE), and the TCI may indicate the downlink beam used for subsequent reception of downlink information on the secondary cell.

In the embodiments of the present application, the physical downlink control channel on the master cell or master secondary cell may also not carry TCI (or the carried TCI does not indicate the downlink beam). At this time, when the terminal device receives the information carried in the physical downlink shared channel on the secondary cell for the first time, the information carried in the physical downlink shared channel may be received on the secondary cell based on the downlink beam expected by the terminal device (the index of the downlink beam indicated in the beam failure recovery request).

In the embodiments of the present application, in response to the transmission of the beam failure recovery request (sent through the master cell or the master secondary cell) or in response to the reception of the confirmation message of the beam failure recovery request (sent through the master cell or the master secondary cell), a first timer is started; and within the duration range of the first timer, the second downlink information is detected on the master cell or the master secondary cell.

Specifically, the event of sending a beam failure recovery request through the master cell or master secondary cell may trigger the terminal device to start the first timer, and the terminal device may detect the second downlink information on the master cell or the master secondary cell within the duration range of the first timer. If the second downlink information is detected (found) within the duration range of the first timer, the terminal device may detect the first downlink information on the secondary cell based on the second downlink information; if the first downlink information is found on the secondary cell, it is considered that the beam failure recovery is successful; and if the first downlink information is not found on the secondary cell, it is considered that the beam failure recovery has failed. Or, after starting the first timer, the terminal device may detect the second downlink information on the master cell or the master secondary cell. If the second downlink information is not found within the duration range of the first timer, it may be considered that the beam failure recovery is not successful.

In the embodiments of the present application, in the case that the beam failure recovery is successful, the terminal device may stop the first timer, and execute the subsequent communication process of normal communication using the secondary cell.

It is mentioned above that the start of the first timer is in response to sending the beam failure recovery request through the master cell or the master secondary cell, but the embodiments of the present application are not limited thereto.

Specifically, in the embodiments of the present application, after the terminal device sends a beam failure recovery request through the master cell or master secondary cell, the network device may send a confirmation message through the master cell or master secondary cell. If the terminal device receives the confirmation message, the terminal device may start the first timer, and detect the second downlink information on the master cell or the master secondary cell within the duration of the first timer.

In another implementation manner, in response to the sending of the beam failure recovery request or in response to the reception of the confirmation message of the beam failure recovery request, the terminal device starts a second timer; and within the duration range of the second timer, the terminal device detects the first downlink information on the secondary cell. The first downlink information may be carried on a physical downlink control channel and/or a physical downlink shared channel.

Specifically, in response to sending the beam failure recovery request through the master cell or the master secondary cell, the terminal device may start a first timer, and within the duration of the first timer, the terminal device detects the first downlink information. If the first downlink information is found within the duration of the first timer, it may be considered that the beam failure recovery is successful; otherwise, it may be considered that the beam failure recovery has failed.

The terminal device may use the beam indicated in the beam failure recovery request (that is, the downlink beam expected by the terminal device) to receive the information carried in the physical downlink control channel and the physical downlink shared channel in the secondary cell. Alternatively, the terminal device may use the desired downlink beam to receive the information carried in the physical downlink control channel, and use the downlink beam corresponding to the TCI carried by the physical downlink control channel to receive the information carried in the subsequent downlink channel, for example, the information carried in the physical downlink shared channel and/or the physical downlink control channel.

Alternatively, in the embodiments of the present application, the physical downlink shared channel on the secondary cell may also carry TCI (carried in the MAC CE), and the TCI may indicate the downlink beam used for subsequent reception of downlink information on the secondary cell.

In the embodiments of the present application, in the case that the beam failure recovery succeeds, the terminal device may stop the second timer, and execute the subsequent communication process of using the secondary cell to communicate normally.

It is mentioned above that the start of the second timer is in response to the beam failure recovery request (which may be sent through the master cell or the master secondary cell), but the embodiments of the present application are not limited thereto.

Specifically, in the embodiments of the present application, after the terminal device sends a beam failure recovery request through the master cell or master secondary cell, the network device may send a confirmation message through the master cell or master secondary cell. If the terminal device receives the confirmation message, the terminal device may start the second timer, and detect the first downlink information on the master cell or the master secondary cell within the duration of the second timer.

Optionally, in the embodiments of the present application, individual secondary cells may have their respective corresponding first timers or second timers, that is, the first timers or the second timers may be configured respectively with respect to each secondary cell (per secondary cell). The first timers or the second timers of different secondary cells may be different, or may also be the same.

Alternatively, in the embodiments of the present application, each terminal device may have its own corresponding first timer or second timer, that is, the first timer or the second timer is configured for each terminal device (per terminal device). The first timers or the second timers of different terminal devices may be different, or may be the same.

Optionally, in the embodiments of the present application, the duration and/or start time of the first timer or the second timer may be indicated by the network device through a Radio Resource Control (RRC) configuration message, or may be broadcasted through a system message.

The above mainly introduces how to determine whether the beam failure recovery is successful, and the following will introduce the operations that the terminal device needs to perform after confirming whether the beam failure recovery is successful.

Optionally, in the implementation of the present application, in the case that it is determined that the beam failure recovery fails, the terminal device may perform one of the following operations (1)-(4):

(1) The terminal device resends the beam failure recovery request to the network device.

Specifically, the terminal device may resend the beam failure recovery request to the network device, and then continue to determine whether the beam failure recovery is successful based on this, and the specific determination method may refer to the above description. In the embodiments of the present application, the number of times the terminal device sends the beam failure recovery request to the network device may be less than or equal to a preset value, where the preset value may be configured by the network device or preset on the terminal device based on a protocol.

(2) The terminal device sends beam failure recovery failure indication information to the network device.

Specifically, if the terminal device confirms that the beam failure recovery has failed, it may send beam failure recovery failure indication information which indicates that the beam failure recovery of the terminal device has failed, and the network device may perform subsequent operations according to the indication information of the terminal device, for example, deactivating the secondary cell, or readjusting the beam for sending downlink information through the secondary cell, etc. The beam failure recovery failure indication information is carried in user equipment (UE) assistance information or MAC CE. The beam failure recovery failure indication information may be sent through the master cell or the master secondary cell. The beam failure recovery failure indication information may carry the identifier of the secondary cell, so that the network device can learn the secondary cell where the beam failure recovery fails.

(3) The terminal device deactivates the secondary cell.

Specifically, if the terminal device confirms that the beam failure recovery fails, it may deactivate the secondary cell. Specifically, a request to deactivate the secondary cell may be sent to the network device, where the request may be sent through the master cell or the master secondary cell. Alternatively, the terminal device may directly deactivate the secondary cell, and send a notification message to the network device to notify the network device that the secondary cell is deactivated, where the notification message may be sent through the master cell or the master secondary cell.

(4) The terminal device initiates random access based on the secondary cell.

Specifically, if the terminal device confirms that the beam failure recovery fails, it may initiate random access based on the secondary cell, where the terminal device may initiate contention-based random access or non-contention-based random access.

If the terminal device does not select a new downlink beam, it may initiate a contention-based random access, and if the terminal device selects a new downlink beam, the terminal device may initiate a non-contention-based random access. The terminal device may use the Physical Random Access Channel (PRACH) resource and/or random access preamble corresponding to the new downlink beam to initiate the random access. Therefore, the network device may determine the new downlink beam selected by the terminal device based on the physical random access channel resource and/or the random access preamble.

In other words, the terminal device may tell the network device which downlink beam to use to send a Random Access Response (RAR) by means of random access, so as to restore the downlink beam. The random access preamble in the random access of the new radio system is configured for per SSB. The terminal device may firstly select an SSB (or CSI-RS, SSB and CSI-RS may be associated) index satisfying a threshold value by comparing Reference Signal Receiving Power (RSRP), and then use the corresponding preamble and PRACH resource on the SSB to send message 1 (Msg 1), that is to say, after the network device receives the preamble, it is known to use the beam corresponding to which SSB to feed back RAR.

Alternatively, in the embodiments of the present application, the terminal device may carry the MAC CE of the beam failure recovery request in the message 3 (MSG 3) of the random access process, and the MAC CE may indicate to the network side which downlink beam to use for subsequent sending of downlink messages.

In the embodiments of the present application, if beam failure occurs in the master cell and the secondary cell at the same time, the terminal device may also initiate random access on the master cell. The random access preamble in MSG 1 may indicate to the network device the downlink beam index of the master cell (that is, the index of the downlink beam expected by the terminal device for the master cell), and MSG 3 may carry the MAC CE indicating the downlink beam index of the secondary cell (that is, the index of the downlink beam expected by the terminal device for the secondary cell).

It should be understood that the terminal device mentioned above may perform any of the above (1)-(4) when it is determined that a beam failure recovery failure has occurred, but the embodiments of the present application are not limited thereto, and the terminal device may also perform more than one of the above (1)-(4). For example, (2) and (3) may be executed.

Optionally, in the embodiments of the present application, when the beam failure recovery is successful, the terminal device resets the BFI_COUNTER counter and stops the beam failure detection timer.

Therefore, in the embodiments of the present application, after sending the beam failure recovery request of the secondary cell to the network device, the terminal device detects the first downlink information on the secondary cell; since whether the first downlink information can be successfully detected on the secondary cell may reflect whether the beam failure recovery of the secondary cell is successful or not, the embodiments of the present application can determine whether the beam failure recovery of the secondary cell is successful according to whether the first downlink information is successfully detected on the secondary cell.

The above describes how to determine whether the beam failure recovery is successful from the terminal side. In the embodiments of the present application, the network device may also determine whether the beam failure recovery of the secondary cell is successful.

Specifically, after the network device receives the beam failure recovery request, the network device starts a timer in response to sending downlink information on the secondary cell. If the network device has received the uplink response with respect to the downlink information within the duration of the timer, it is considered that the beam failure recovery of the secondary cell is successful; otherwise, it is considered that the beam failure recovery of the secondary cell has failed.

Among them, the downlink information mentioned here may be carried on a physical downlink control channel, and the uplink response may be carried on a physical uplink shared channel scheduled by the physical downlink control channel. Alternatively, the downlink information may be carried on a physical downlink data channel, and the uplink response may be an acknowledgment message of the physical downlink data channel.

If the network device confirms that the beam failure recovery of the secondary cell is successful, the subsequent communication process through the secondary cell may be executed normally. If the network device confirms that the beam failure recovery of the secondary cell fails, it may deactivate the cell, or resend the downlink information, or change the downlink transmission beam for sending the downlink information, etc.

Figure 3:
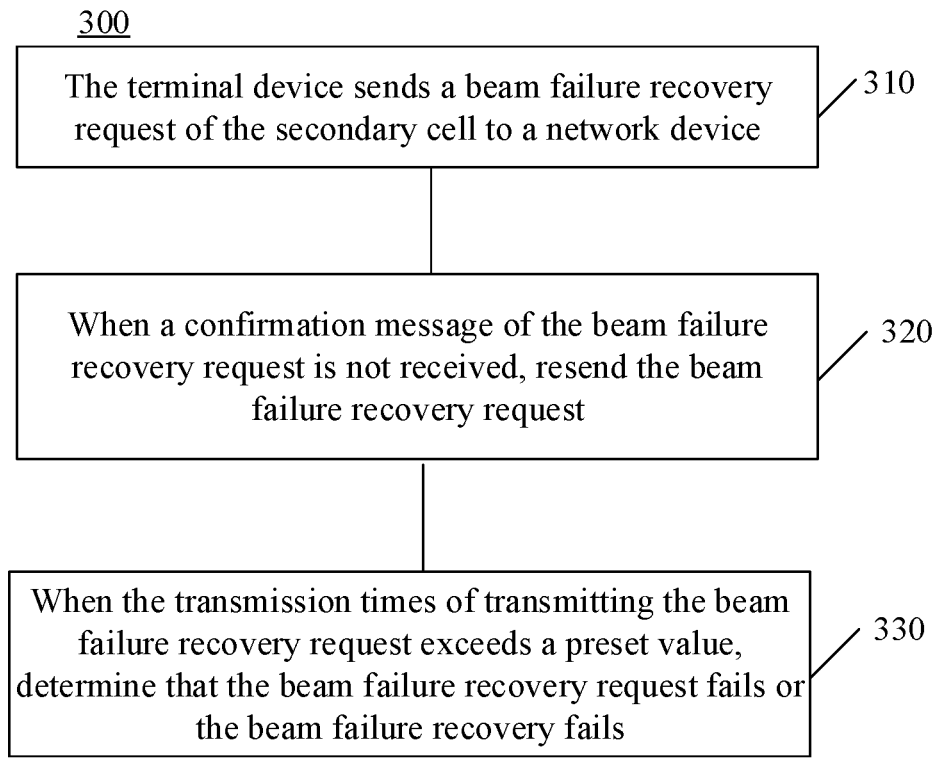
FIG. 3 is a schematic diagram of a wireless communication method provided by an embodiment of the present application.

FIG. 3 is a schematic flowchart of a wireless communication method 300 according to an embodiment of the present application. The method 300 includes at least part of the following content.

In 310, the terminal device sends a beam failure recovery request of a secondary cell to the network device.

Optionally, in the embodiments of the present application, the beam failure recovery request is carried in a scheduling request or an MAC CE.

Optionally, in the embodiments of the present application, the beam failure recovery request indicates an identifier of the secondary cell and an index of a beam expected by the terminal device.

For the specific implementation of the 310, the specific description of 210 in the method 200 may be referred to. For brevity, details are not described herein again.

In 320, if a confirmation message of the beam failure recovery request is not received, the beam failure recovery request is resent.

Specifically, the terminal device starts a timer in response to the sending of the beam failure recovery request; and if the confirmation message is not received when the timer expires, resends the beam failure recovery request.

The terminal device may send the beam failure recovery request through the master cell or the master secondary cell, and the terminal device may receive the confirmation message through the master cell or the master secondary cell.

Alternatively, the terminal device may send the beam failure recovery request through the master cell or the master secondary cell, and the terminal device may receive the confirmation message through the secondary cell.

Alternatively, the terminal device may send a beam failure recovery request through the secondary cell, and the terminal device may receive the confirmation message through the secondary cell.

In 330, when the number of times of sending the beam failure recovery request exceeds a preset value, it is determined that the beam failure recovery request has failed or the beam failure recovery has failed. The preset value may be configured by the network device, or preset on the terminal device based on a protocol.

Optionally, in the embodiments of the present application, in the case where it is determined that the beam failure recovery request fails or the beam failure recovery fails, the terminal device initiates random access based on the secondary cell, or the terminal device deactivates the secondary cell. For the method of initiating random access and deactivating the secondary cell based on the secondary cell, reference may be made to the description of the method 200. For brevity, details are not described herein again.

Therefore, in the embodiments of the present application, the terminal device sends the beam failure recovery request of the secondary cell to the network device; in the case of not receiving the confirmation message of the beam failure recovery request, resends the beam failure recovery request; and when the number of times of sending the beam failure recovery request exceeds the preset value, determines that the beam failure recovery request or the beam failure recovery has failed, therefore it can be reasonably confirmed whether the beam failure recovery request or the beam failure recovery has failed.

Figure 4:
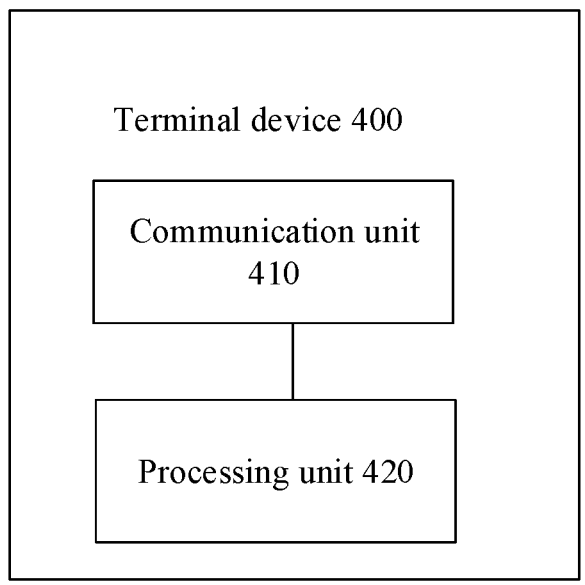
FIG. 4 is a schematic block diagram of a terminal device provided by an embodiment of the present application.

FIG. 4 is a schematic block diagram of a terminal device 400 according to an embodiment of the present application. The terminal device 400 includes a communication unit 410 and a processing unit 420.

The communication unit 410 is configured to: after sending a beam failure recovery request of a secondary cell to a network device, detect first downlink information on the secondary cell.

The processing unit 420 is configured to determine whether the beam failure recovery of the secondary cell is successful according to whether the first downlink information is successfully detected by the communication unit.

Optionally, in the embodiments of the present application, the communication unit 410 is further configured to:

after sending the beam failure recovery request to the network device through a master cell or a master secondary cell, detect second downlink information on the master cell or the master secondary cell; and in a case where the second downlink information is detected (found), detect the first downlink information on the secondary cell based on the second downlink information.

Optionally, in the embodiments of the present application, the processing unit 420 is further configured to:

in response to sending of the beam failure recovery request or in response to reception of a confirmation message of the beam failure recovery request, start a first timer.

The communication unit 410 is further configured to: detect the second downlink information on the master cell or the master secondary cell within a duration range of the first timer.

Optionally, in the embodiments of the present application, the first downlink information is carried on a physical downlink shared channel, and the second downlink information is carried on a physical downlink control channel that schedules the physical downlink shared channel.

Optionally, in the embodiments of the present application, the processing unit 420 is further configured to:

if the beam failure recovery is successful, stop the first timer.

Optionally, in the embodiments of the present application, the processing unit 420 is further configured to: in response to the sending of the beam failure recovery request or in response to the reception of the confirmation message of the beam failure recovery request, start a second timer.

The communication unit is further configured to: detect the first downlink information on the secondary cell within a duration range of the second timer.

Optionally, in the embodiments of the present application, the processing unit 420 is further configured to stop the second timer when the beam failure recovery is successful.

Optionally, in the embodiments of the present application, the first downlink information is carried on a physical downlink shared channel or a physical downlink control channel.

Optionally, in the embodiments of the present application, the communication unit 410 is further configured to:
  in a case that the beam failure recovery fails, resend the beam failure recovery request to the network device, or, send beam failure recovery failure indication information to the network device, or,
  initiate a random access based on the secondary cell, or,
  deactivate the secondary cell.

Optionally, in the embodiments of the present application, when the communication unit 410 resends the beam failure recovery request to the network device, the number of times the beam failure recovery request is sent is less than or equal to a preset value; or,
  in the case that the communication unit 410 sends the beam failure recovery failure indication information to the network device, the beam failure recovery failure indication information is carried in user equipment (UE) assistance information or the medium access control (MAC) control element (CE).

Optionally, in the embodiments of the present application, the processing unit 420 is further configured to:
  in the case that the beam failure recovery is successful, reset a BFI_COUNTER counter and stop a beam failure detection timer.

Optionally, in the embodiments of the present application, the beam failure recovery request is sent through the master cell or master secondary cell of the terminal device.

Optionally, in the embodiments of the present application, the beam failure recovery request is carried in a scheduling request or MAC CE.

Optionally, in the embodiments of the present application, the beam failure recovery request indicates an identifier of the secondary cell and an index of a downlink beam expected by the terminal device.

It should be understood that the terminal device 400 may be used to implement the operations implemented by the terminal device in the foregoing method 200, and will not be repeated here for brevity.

Figure 5:
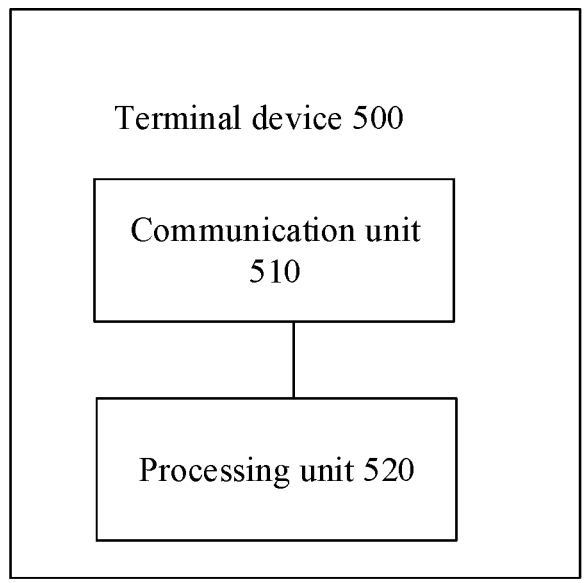
FIG. 5 is a schematic block diagram of a terminal device provided by an embodiment of the present application.

FIG. 5 is a schematic block diagram of a terminal device 500 according to an embodiment of the present application. The terminal device 500 includes a communication unit 510 and a processing unit 520.

The communication unit 510 is configured to: send a beam failure recovery request of the secondary cell to the network device; and if the confirmation message of the beam failure recovery request is not received, resend the beam failure recovery request.

The processing unit 520 is configured to: when the number of times of sending the beam failure recovery request exceeds a preset value, determine that the beam failure recovery request has failed or the beam failure recovery has failed.

Optionally, in the embodiments of the present application, the processing unit 520 is further configured to:
  in response to the sending of the beam failure recovery request, start a timer.

The communication unit 510 is further configured to: if the confirmation message is not received when the timer expires, resend the beam failure recovery request.

Optionally, in the embodiments of the present application, the communication unit 510 is further configured to:
  initiate random access based on the secondary cell, or, deactivate the secondary cell.

Optionally, in the embodiments of the present application, the beam failure recovery request is carried in the scheduling request or the media access control (MAC) control unit (CE).

Optionally, in the embodiments of the present application, the beam failure recovery request indicates the identifier of the secondary cell and the index of the downlink beam expected by the terminal device.

It should be understood that the terminal device 500 may be used to implement the operations implemented by the terminal device in the foregoing method 300, and will not be repeated here for brevity.

Figure 6:
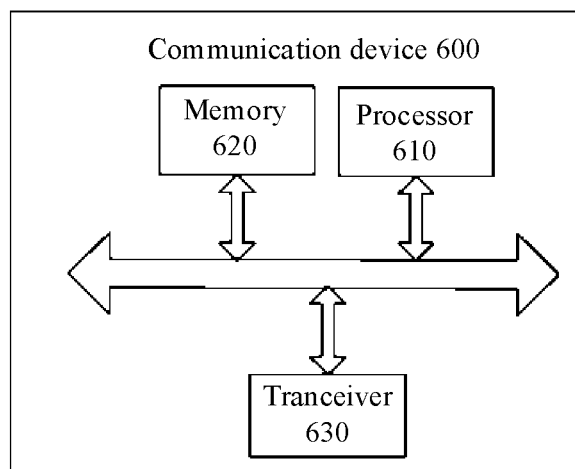
FIG. 6 is a schematic block diagram of a communication device provided by an embodiment of the present application.

FIG. 6 is a schematic structural diagram of a communication device 600 provided by an embodiment of the present application. The communication device 600 shown in FIG. 6 includes a processor 610, and the processor 610 may call and run a computer program from the memory to implement the method in the embodiments of the present application.

Optionally, as shown in FIG. 6, the communication device 600 may further include a memory 620. The processor 610 may call and run a computer program from the memory 620 to implement the method in the embodiments of the present application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of antennas may be one or more.

Optionally, the communication device 600 may specifically be the network device of the embodiments of the application, and the communication device 600 may implement the corresponding process implemented by the network device in each method of the embodiments of the application, which are not repeated here for the sake of brevity.

Optionally, the communication device 600 may specifically be a mobile terminal/terminal device of the embodiments of the present application, and the communication device 600 may implement the corresponding process implemented by the mobile terminal/terminal device in each method of the embodiments of the present application, which are not repeated here for the sake of brevity.

Figure 7:
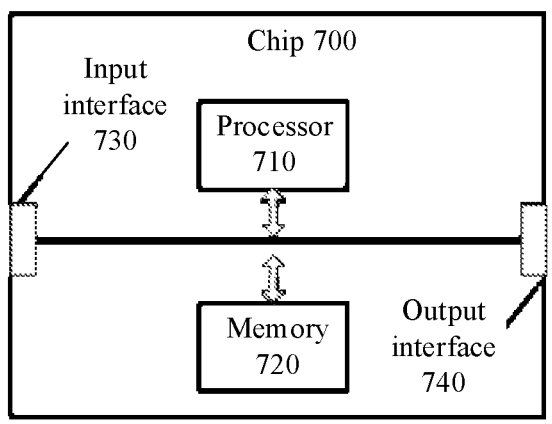
FIG. 7 is a schematic block diagram of a chip provided by an embodiment of the present application.

FIG. 7 is a schematic structural diagram of a chip of an embodiment of the present application. The chip 700 shown in FIG. 7 includes a processor 710, and the processor 710 may call and run a computer program from the memory to implement the methods in the embodiments of the present application.

Optionally, as shown in FIG. 7, the chip 700 may further include a memory 720. The processor 710 may call and run a computer program from the memory 720 to implement the methods in the embodiments of the present application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device in the embodiments of the present application, and the chip may implement the corresponding process implemented by the network device in each method of the embodiments of the present application, which are not repeated here for the sake of brevity.

Optionally, the chip may be applied to the mobile terminal/terminal device in the embodiments of the present application, and the chip may implement the corresponding process implemented by the mobile terminal/terminal device in each method of the embodiments of the present application, which are not repeated here for the sake of brevity.

It should be understood that the chip mentioned in the embodiments of the present application may also be referred to as a system-level chip, a system chip, a chip system, or a system-on-chip, etc.

It should be understood that the processor of the embodiments of the present application may be an integrated circuit chip with signal processing capability. In the implementation process, the steps of the foregoing method embodiments may be completed by hardware integrated logic circuits in the processor or instructions in the form of software. The aforementioned processor may be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application may be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module may be located in a mature storage medium in the art, such as a random access memory, a flash memory, a read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both volatile memory and non-volatile memory. Among them, the non-volatile memory may be a Read-Only Memory (ROM), a Programmable ROM (PROM), an Erasable PROM (EPROM), and an Electrically EPROM (EEPROM) or a flash memory. The volatile memory may be a Random Access Memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these and any other suitable types of memories.

It should be understood that the foregoing memories are exemplary but not restrictive. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. In other words, the memories in the embodiments of the present application are intended to include, but are not limited to, these and any other suitable types of memory.

The embodiments of the present application also provide a computer-readable storage medium for storing computer programs.

Optionally, the computer-readable storage medium may be applied to the network device in the embodiments of the present application, and the computer program causes the computer to execute the corresponding process implemented by the network device in each method of the embodiments of the present application, which are not repeated here for the sake of brevity.

Optionally, the computer-readable storage medium may be applied to the mobile terminal/terminal device in the embodiments of the present application, and the computer program causes the computer to execute the corresponding process implemented by the mobile terminal/terminal device in each method of the embodiments of the present application, which are not repeated here for the sake of brevity.

The embodiments of the present application also provide a computer program product, including computer program instructions.

Optionally, the computer program product may be applied to the network device in the embodiments of the present application, and the computer program instructions cause the computer to execute the corresponding process implemented by the network device in each method of the embodiments of the present application, which are not repeated here for the sake of brevity.

Optionally, the computer program product may be applied to the mobile terminal/terminal device in the embodiments of the present application, and the computer program instructions cause the computer to execute the corresponding process implemented by the mobile terminal/terminal device in each method of the embodiments of the present application, which are not repeated here for the sake of brevity.

The embodiment of the present application also provides a computer program.

Optionally, the computer program may be applied to the network device in the embodiments of the present application. When the computer program runs on a computer, it causes the computer to execute the corresponding process implemented by the network device in each method of the embodiments of the present application, which are not repeated here for the sake of brevity.

Optionally, the computer program may be applied to the mobile terminal/terminal device in the embodiments of the present application. When the computer program runs on a computer, it causes the computer to execute the corresponding process implemented by the mobile terminal/terminal device in each method of the embodiments of the present application, which are not repeated here for the sake of brevity.

A person of ordinary skill in the art may be aware that the units and algorithm steps of the examples described in combination with the embodiments disclosed herein may be implemented by electronic hardware or a combination of computer software and electronic hardware. Whether these functions are executed by hardware or software depends on the specific application and design constraint conditions of the technical solution. Professionals and technicians may use different methods for each specific application to implement the described functions, but such implementation should not be considered beyond the scope of the present application.

Those skilled in the art can clearly understand that, for the convenience and conciseness of description, the specific working process of the above-described system, apparatus, and unit may refer to the corresponding process in the foregoing method embodiments, which are not elaborated here.

In the several embodiments provided in the present application, it should be understood that the disclosed system, apparatus, and method may be implemented in other ways. For example, the apparatus embodiments described above are only illustrative. For example, the division of the units is only a logical function division, and there may be other divisions in actual implementation, for example, a plurality of units or components may be combined or may be integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the function is implemented in the form of a software functional unit and sold or used as an independent product, it may be stored in a computer readable storage medium. Based on this understanding, the essence of the technical solution or the part that contributes to the related art or the part of the technical solution in the present application may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

The above contents are only specific implementations of the present application, and the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A wireless communication method, comprising:
   after sending a beam failure recovery request of a secondary cell to a network device, detecting, by a terminal device, first downlink information on the secondary cell;
   according to whether the first downlink information is successfully detected, determining, by the terminal device, whether a beam failure recovery of the secondary cell is successful;
   in a case that a beam failure occurs in a master cell and the secondary cell at the same time, initiating, by the terminal device, a random access on the master cell, wherein a random access preamble in MSG 1 indicates to the network device a downlink beam index of the master cell, and MSG 3 carries an MAC control element (MAC CE) indicating a downlink beam index of the secondary cell.

2. The method according to claim 1, wherein the detecting, by the terminal device, the first downlink information on the secondary cell comprises:
   after sending the beam failure recovery request to the network device through the master cell or a master secondary cell, detecting, by the terminal device, second downlink information on the master cell or the master secondary cell; and
   in a case that the second downlink information is found, detecting, by the terminal device, the first downlink information on the secondary cell based on the second downlink information,
   wherein the detecting the second downlink information on the master cell or the master secondary cell comprises:
   in response to sending of the beam failure recovery request or in response to reception of a confirmation message of the beam failure recovery request, starting a first timer; and
   detecting the second downlink information on the master cell or the master secondary cell within a duration range of the first timer.

3. The method according to claim 2, wherein the first downlink information is carried on a physical downlink shared channel, and the second downlink information is carried on a physical downlink control channel for scheduling the physical downlink shared channel.

4. The method according to claim 2, wherein the method further comprises:
   in a case that the beam failure recovery is successful, stopping, by the terminal device, the first timer.

5. The method according to claim 1, wherein the detecting, by the terminal device, the first downlink information on the secondary cell comprises:
   in response to sending of the beam failure recovery request or in response to reception of a confirmation message of the beam failure recovery request, starting, by the terminal device, a second timer; and
   detecting, by the terminal device, the first downlink information on the secondary cell within a duration range of the second timer,
   wherein the method further comprises:
   in a case that the beam failure recovery is successful, stopping, by the terminal device, the second timer.

6. The method according to claim 5, wherein the first downlink information is carried on a physical downlink shared channel or a physical downlink control channel.

7. The method according to claim 1, wherein the method further comprises:
   in a case that the beam failure recovery is successful, resetting a beam failure instance counter and stopping a beam failure detection timer by the terminal device.

8. The method according to claim 1, wherein the beam failure recovery request is sent through a master cell or a master secondary cell of the terminal device.

9. The method according to claim 1, wherein the beam failure recovery request is carried in a scheduling request or the MAC CE.

10. The method according to claim 1, wherein the beam failure recovery request indicates an identifier of the secondary cell and an index of a downlink beam expected by the terminal device.

11. A terminal device, comprising:
a processor and a memory, wherein the memory is configured to store a computer program, and the processor is configured to call and run the computer program stored in the memory to:
after sending a beam failure recovery request of a secondary cell to a network device, detect first downlink information on the secondary cell;
determine whether a beam failure recovery of the secondary cell is successful according to whether the first downlink information is successfully detected;
in a case that a beam failure occurs in a master cell and the secondary cell at the same time, initiate a random access on the master cell, wherein a random access preamble in MSG 1 indicates to the network device a downlink beam index of the master cell, and MSG 3 carries an MAC control element (MAC CE) indicating a downlink beam index of the secondary cell.

12. The terminal device according to claim 11, wherein the processor is further configured to:
after sending the beam failure recovery request to the network device through the master cell or a master secondary cell, detect second downlink information on the master cell or the master secondary cell; and
in a case that the second downlink information is found, detect the first downlink information on the secondary cell based on the second downlink information.

13. The terminal device according to claim 12, wherein the first downlink information is carried on a physical downlink shared channel, and the second downlink information is carried on a physical downlink control channel for scheduling the physical downlink shared channel.

14. The terminal device according to claim 12, wherein the processor is further configured to:
in response to sending of the beam failure recovery request or in response to reception of a confirmation message of the beam failure recovery request, start a first timer; and
detect the second downlink information on the master cell or the master secondary cell within a duration range of the first timer.

15. The terminal device according to claim 14, wherein the processor is further configured to:
in a case that the beam failure recovery is successful, stop the first timer.

16. The terminal device according to claim 11, wherein the processor is further configured to: in response to sending of the beam failure recovery request or in response to reception of a confirmation message of the beam failure recovery request, start a second timer; and
detect the first downlink information on the secondary cell within a duration range of the second timer,
wherein the processor is further configured to stop the second timer in a case that the beam failure recovery is successful.

17. The terminal device according to claim 16, wherein the first downlink information is carried on a physical downlink shared channel or a physical downlink control channel.

18. The terminal device according to claim 11, wherein the processor is further configured to:
in a case that the beam failure recovery is successful, reset a beam failure instance counter and stop a beam failure detection timer.

* * * * *